Figure 1:
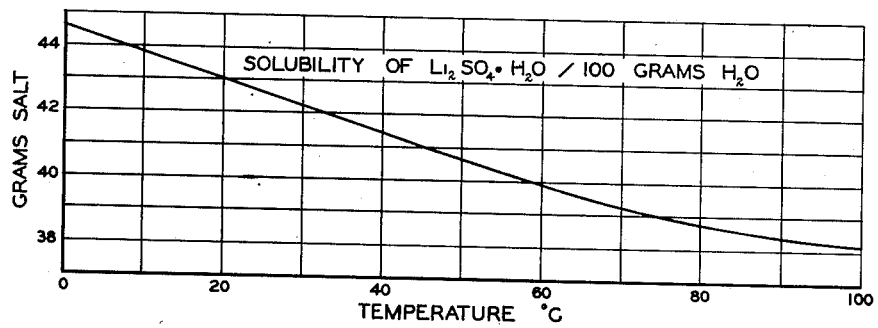

July 22, 1952     L. B. CHAMBERS     2,604,385

METHOD OF GROWING A CRYSTAL

Filed June 17, 1947

INVENTOR.
LAWRENCE B. CHAMBERS
BY
*Elmer J. Hyde*
ATTORNEY

Patented July 22, 1952

2,604,385

UNITED STATES PATENT OFFICE 2,604,385

METHOD OF GROWING A CRYSTAL

Lawrence B. Chambers, Cleveland, Ohio, assignor to The Brush Development Company, Cleveland, Ohio, a corporation of Ohio Application June 17, 1947, Serial No. 755,095

2 Claims. (Cl. 23—301)

This invention pertains to the growth of moderate size clear crystals, particularly of the materials lithium sulfate monohydrate, lithium selenate monohydrate, and mixtures thereof.

A detailed description of the crystal lithium sulfate monohydrate, its cuts and their uses, is given in an application of Hans Jaffe, Serial No. 755,167, filed concurrently herewith and assigned to the same assignee as the present application (issued as Patent No. 2,490,216 on December 6, 1949). Another method and means for growing the several crystals is described and claimed in an application, Serial No. 755,091 (now abandoned), filed concurrently herewith in the name of Edward M. Brazis and assigned to the same assignee as the present application.

It is known that crystals of Rochelle salt, primary ammonium phosphate and the like may be grown from a saturated hot water solution of the material by gradually lowering the temperature of the solution while continuously effecting relative motion between the solution and seed crystals of the material planted in the solution to cause the material to deposit on the seed crystals.

Lithium sulfate monohydrate, $Li_2SO_4 \cdot H_2O$, and its companion crystal lithium selenate monohydrate cannot be grown by such a process and, accordingly, lithium sulfate monohydrate has been grown by several other processes one of which is to evaporate the solvent from a solution containing lithium sulfate monohydrate and another of which is to remove the solvent from a solution by a dehydrating agent. Growth of crystalline material by these processes is very slow thereby making the crystals obtained quite expensive.

An object of the present invention is to provide an improved method of growing crystals of lithium sulfate monohydrate, lithium selenate monohydrate and mixtures thereof.

A further object of the invention is to provide a method of rapidly growing moderate size clear crystals of lithium sulfate monohydrate.

In accordance with the invention, the method of producing a clear solid crystal of a chemical substance, for example, lithium sulfate monohydrate, lithium selenate monohydrate or mixtures of the two, the solubility of which in a given solvent decreases with increasing temperature of a solution of the chemical substance and the solvent, comprises the following steps: (a) planting a seed piece of the substance in a solution of the substance, and (b) increasing the temperature of the solution so that the solution becomes oversaturated, whereby the substance is caused to crystallize out of the solution onto the seed piece.

Other objects and a fuller understanding of the invention may be had by referring to the following description, claims and drawing.

Figure 2:
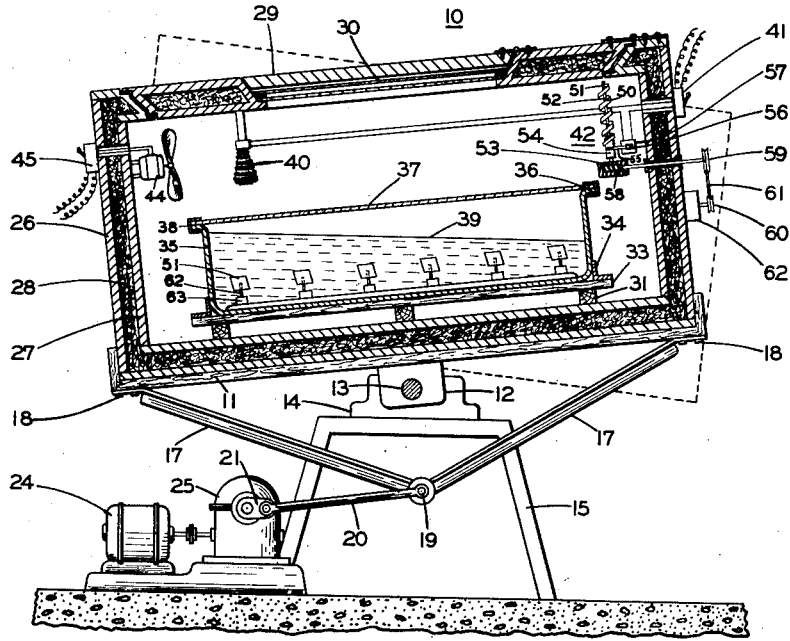
Figure 3:
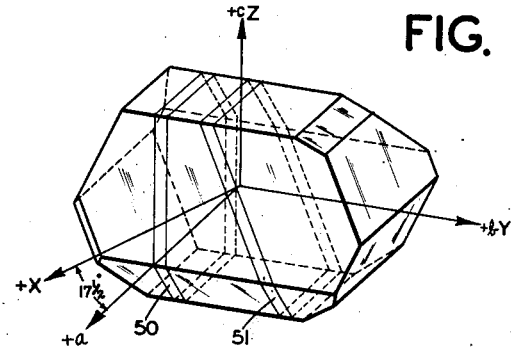

Fig. 1 of the single sheet of the drawing is a graph showing the solubility of lithium sulfate monohydrate in water over a range of temperature; Fig. 2 is a sectional view of an equipment suitable for growing crystals by the process of the invention; and Fig. 3 is an isometric view of a crystal of lithium sulfate monohydrate.

The solubility in water of the materials lithium sulfate monohydrate ($Li_2SO_4 \cdot H_2O$) and lithium selenate monohydrate, unlike most soluble materials, decreases as the temperature of their solution increases, so that a crystal of the substance cannot be grown by temperature-drop methods.

The solubility curve of the material lithium sulfate monohydrate over the temperature range from 0 to 100 degrees centigrade, in terms of grams of $Li_2SO_4 \cdot H_2O$ per 100 grams of $H_2O$, is given in Fig. 1. The decrease in the amount of the chemical substance which a given amount of solvent will hold in solution with rising temperature is so small that when I proposed to grow lithium sulfate monohydrate by a process involving a rise in the temperature of the solution, the idea was stated by a number of experts to be impractical. However, the process has proved to be practical for growing, in a short time, crystals of a moderate size.

Fig. 2 illustrates equipment for growing crystals of material whose solubility at various temperatures is illustrated by the curve shown in Fig. 1, wherein by gradually increasing the temperature of an aqueous solution of the material over a period of time while continuously effecting relative motion between the solution and seed pieces of the material planted in the solution crystals are caused to grow.

The equipment comprises an enclosed box, indicated generally by the reference character 10, mounted on a platform 11 which is connected to a plurality of bearings 12 (only one shown) for rocking motion about a shaft 13. The shaft is supported on and slightly above a base 15 by means of a plurality of end plates 14 (only one shown). One end of each of a pair of arms 17 is connected to the base 11 near the outside edge thereof by bolts 18, and the other end of each of the arms is connected to an actuating arm 20 at point 19 substantially directly underneath the shaft 13 when the rocking box 10 is in a horizontal position, and the other end of the actuating arm 20 is connected to one end of a crank arm 21. The crank arm 21 is rotated slowly by power from motor 24 acting through a speed reducer 25 to cause the box 10 to rock through an angle of about 13 degrees with a frequency of about four cycles per minute.

The box 10 may comprise two layers 26, 27 of wood or metal between which is a layer of insulating material 28 to reduce heat loss through the walls, bottom and top thereof, and a double-glass observation window 30 is sealed into the top of the box 10. A door 29 is provided for closing the window opening to reduce heat loss therethrough.

Connected to the bottom of the box are a number of stringers 31, and supports 33 are connected to the stringers 31. The supports are thus spaced away from the bottom of the box 10 in order that circulating air may contact the bottom of a crystallization tray 35 which is mounted on the supports 33. Angular clips 34 are connected to the supports 33 near their ends and are spaced apart a distance equal to the width of the tray 35 to prevent the tray from sliding as the box 10 rocks.

Tray 35 preferably is formed of metal and has a horizontally extending lip portion 36. A glass top 37 extends across the top of the tray 35 resting on the lip 36 and sealing means 38 are provided to prevent evaporation during a growing cycle of the solution 39 within the tray 35.

Mounted within the box 10 is an electric heater 40 whose current supply is controlled by an on-and-off switch 41 attached to the outside surface of the box 10 and by thermostatic switch 42 means mounted partially inside and partially outside of the box 10. An electric fan 44 is attached to the inside surface of the box and electric current to the fan is controlled by an on-and-off switch 45 mounted on the outside of the box. When the fan is in operation it circulates air around the heater 40 and around the tray 35 thereby controlling the temperature of the solution 39 held by the tray 35.

The thermostatic switch means 42 controls the supply of electric current to the heater 40 in a manner to cause over a period of days a gradual increase of the temperature within the box 10. The electric current to the heater 40 is supplied from an outside source through the on-and-off switch 41, and when the switch 41 is in the on-position the thermostatic switch means 42 governs the percentage of time during which the heater 40 is energized. Such thermostatic switches are well known, so only a brief description of it is here given. The heat sensitive portion of the switch comprises a helically wound bimetal member 50 one end of which is connected at 51 to a rotatable rod 52 extending longitudinally back through the bimetal member 50 to a spur gear 53. The other end of the bimetal member 50 is connected to a rotatable tube 54 which surrounds the rod 52, and a contact arm 55 carrying a contact point 56 is connected at right angles to the tube 54. A contact point 57 is spaced from the contact point 56 in the arcuate path of the point 56 as tube 54 rotates, and the contact points 56, 57 are connected into the heater current supply circuit in such a manner that when the points engage each other current flows to the heater 40. The spur gear 53 is meshed with a worm gear 58 which is driven slowly through pulleys 59, 60 and their interconnecting belt 61 by a clock mechanism 62. As the clock 62 drives the gear chain 58, 53 the end 51 of the bimetal member 50 is rotated slightly, thereby altering the temperature at which the bimetal member causes the contact 56 to engage the contact 57 to close the heater circuit.

When crystals of lithium sulfate monohydrate are to be grown, a number of seeds are cut from a mother crystal. Fig. 3 is an isometric view of such a crystal, and reference characters 50 and 51 indicate plate-like seeds which may be cut therefrom for planting in the growing solution. Other types of seeds, of course, may also be used with this process. A small hole is drilled in a narrow edge face of each seed plate and one end of a peg 62 is cemented into each hole and the other end of the peg is cemented into a hole in a cork 63 or other such supporting means. A number of the seeds are then mounted across the bottom of the tray 35 by cementing the supporting means 63 to the bottom of the tray.

The solution 39 is prepared by dissolving a quantity of lithium sulfate monohydrate in a given amount of water to provide a saturated solution at a temperature of about 25° C. This temperature is not critical, but for greatest economy should be as low as practicable without refrigeration.

Sufficient sulphuric acid is added to the solution to bring it within the range of from about .1 to .3 normal acid. This compares to a pH between 4.5 and 2.5. Desirable sideways growth in the direction of the x-axis is obtained in solutions having a pH in the range between 4.5 and 2.5. For a pH of about 5.5 there is little or no sideways growth. A pH value of about 6.5 caused undesirable tapering of the crystal as it grows on the seed leading to unduly high scrap loss when transducer plates are cut from the grown crystal. When the solution has a pH in the range 4.5 to 2.5 the danger of spontaneous crystallization is somewhat greater than when the solution has a pH of 5.5, but this danger can be kept well under control by stirring the solution and by carefully controlling the temperature change.

The tray 35 with its affixed seeds 51 but empty of solution is placed in the rocking box 10, and the temperature of the box, the tray, and the seeds is brought to within a degree or two of the temperature of the solution which was made up. The fan 44 is then started but the heater 40 is not energized. The solution 39 is poured into the tray, rocking is started through an angle of about 13 degrees with a frequency of about 4 cycles per minute, and the automatic temperature regulator 42 is set to turn the heater 40 on and off at time intervals depending upon the temperature of the box and its contents. A gradual temperature rise of from about 2 to 3 degrees centigrade per day has been found satisfactory, although with faster rocking the rate of temperature rise may be increased. The process is continued as long as desired, and of course the longer the crystallization run the larger will be the crystals obtained therefrom. It becomes, however, somewhat impractical to maintain high temperatures in the box. At high temperatures it is more difficult to remove the crystals from the box without cracking them due to the thermal shock when they meet cool air. Accordingly, it is preferable to discontinue the crystallization run before the temperature goes over about 85° C.

Care must be exercised not to raise the temperature of the solution 39 too fast. To do so causes "breakdown," forming a large number of spurious crystals which support undesirable crystalline growth and take solute from the solution 39 which otherwise would deposit on the seeds as clear solid crystalline material. The result is that the seed pieces will not grow as big as they should. Breakdown of the lithium sulfate monohydrate solution is more serious than breakdown in a Rochelle salt or primary ammonium phosphate solution because its change in solubility with changing temperature is very slight so that only a small amount of salt can be crystallized out of a given amount of solution within a given temperature range. Thus, if this small amount of salt is deposited on spurious crystals, the desired growth on seed crystals will be very small.

A preferred way of removing the hot crystal from the rocking box 10 is to quickly drain the solution from the tray 35, either by siphoning it out or through a gravity drain (not shown), and then to allow the crystals to remain in the hot sealed box until the box and consequently the crystals therein have gradually assumed room temperature, at which point it is safe to remove or pick the crystals. Another method which is satisfactory is to heat a quantity of mineral oil or the like to a temperature within about a degree of the temperature of the crystals at the end of the crystallization run. When the crystals are fully grown they are picked out of the hot solution 39 and immediately plunged into the hot mineral oil. The temperature of the mineral oil and the crystals therein is then reduced over a period of about twelve hours to room temperature, and the crystals are then removed.

While the invention has been described with a certain degree of particularity it is to be understood that changes can be made without departing from the spirit and scope of the invention as hereafter claimed.

I claim as my invention:

1. The method of producing a clear solid crystal of the substance lithium sulphate monohydrate which comprises: planting a seed piece of lithium sulphate monohydrate in a saturated water solution of lithium sulphate monohydrate, increasing the temperature of the said solution from about 25 degrees centigrade to about 85 degrees centigrade over a time period of from about 20 days to about 30 days so that said solution becomes oversaturated and the lithium sulphate monohydrate in solution is caused to crystallize out of the solution onto said seed piece, at the end of said time period picking the grown crystal from the hot solution, placing said picked crystal in oil having a temperature about equal to the temperature of the hot solution at the time the crystal was picked, and cooling the oil and the crystal therein until they reach room temperature.

2. The method of producing a clear solid crystal of the substance lithium sulphate monohydrate which comprises preparing a saturated water solution of lithium sulphate monohydrate, adding acid to said solution to make the solution .1 to .3 normal acid, planting a seed piece of lithium sulphate monohydrate in a saturated water solution of lithium sulphate monohydrate, and increasing the temperature of the said solution from about 25 degrees centigrade to about 85 degrees centigrade over a time period of from about 20 days to about 30 days so that said solution becomes oversaturated and the lithium sulphate monohydrate in solution is caused to crystallize out of the solution onto said seed piece, at the end of said time period picking the grown crystal from the hot solution, placing said picked crystal in oil having a temperature about equal to the temperature of the hot solution at the time the crystal was picked, and cooling the oil and the crystal therein.

LAWRENCE B. CHAMBERS.

REFERENCES CITED

The following references are of record in the file of this patent:

UNITED STATES PATENTS

| Number | Name | Date |
|---|---|---|
| Re. 19,697 | Kjellgren | Sept. 10, 1935 |
| 1,578,677 | Nicolson | Mar. 30, 1926 |
| 1,906,757 | Kjellgren | May 2, 1933 |
| 1,886,868 | Burnham | Nov. 8, 1932 |
| 2,452,576 | Kjellgren | Nov. 2, 1948 |

OTHER REFERENCES

Seidell: "Solubilities of Inorganic and Organic Compounds," D. Van Nostrand Co., Inc., New York, 1919, vol. 1, page 377.

Mellor: Comprehensive Treatise on Inorganic and Theoretical Chemistry, Longmans, Green and Co., New York, N. Y., 1937; vol. 2, page 664, and vol. 10, page 855.